(12) United States Patent
Chapman et al.

(10) Patent No.: US 6,446,254 B1
(45) Date of Patent: Sep. 3, 2002

(54) PACKAGING MEMORY IMAGE FILES

(75) Inventors: Graham Chapman; John Duimovich; Trent Gray-Donald; Graeme Johnson; Andrew Low; Peter Wiebe Burka, all of Ottawa (CA); Patrick James Mueller, Apex, NC (US); Ryan Andrew Sciampancone; Peter Duncan Shipton, both of Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,154

(22) Filed: Aug. 13, 1999

(30) Foreign Application Priority Data

Mar. 30, 1999 (CA) ............................................. 2267477

(51) Int. Cl.[7] ................................................ G06F 9/44
(52) U.S. Cl. ...................... 717/116; 717/118; 717/165
(58) Field of Search ........................... 717/1, 100, 108, 717/116, 148, 162, 165; 700/17; 703/22; 707/500, 513, 203

(56) References Cited

U.S. PATENT DOCUMENTS

| | | | | |
|---|---|---|---|---|
| 6,006,231 A | * | 12/1999 | Popa .......................... 707/101 |
| 6,012,068 A | * | 1/2000 | Boezeman et al. .......... 707/104 |
| 6,025,826 A | * | 2/2000 | Hung et al. .................. 345/418 |
| 6,026,405 A | * | 2/2000 | Arda et al. ................... 707/10 |
| 6,061,057 A | * | 5/2000 | Knowlton et al. ........... 345/744 |
| 6,083,279 A | * | 7/2000 | Cuomo et al. ................ 717/3 |
| 6,112,304 A | * | 8/2000 | Clawson ...................... 713/156 |
| 6,121,903 A | * | 9/2000 | Kalkstein ..................... 341/63 |
| 6,144,992 A | * | 11/2000 | Turpin et al. ................ 709/208 |
| 6,161,107 A | * | 12/2000 | Stern .......................... 707/104 |
| 6,166,729 A | * | 12/2000 | Acosta et al. ................ 345/719 |
| 6,230,184 B1 | * | 5/2001 | White et al. ................. 709/201 |
| 6,281,874 B1 | * | 8/2001 | Sivan et al. .................. 345/127 |
| 6,301,582 B1 | * | 10/2001 | Johnson et al. .............. 707/103 |
| 6,330,709 B1 | * | 12/2001 | Johnson et al. .............. 717/100 |
| 6,349,344 B1 | * | 2/2002 | Sauntry et al. .............. 709/332 |
| 6,349,404 B1 | * | 2/2002 | Moore et al. ................ 717/100 |

OTHER PUBLICATIONS

Kniesel et al, "JMangler a framework for load time and transformation of Java class files", IEEE SCAM, pp. 98–108, 2001.*
Jackson et al, "Lightweight extraction of object models from bytecode", IEEE Software Engineering, vol. 27, No. 2, pp. 158–169, Feb. 2001.*
Dourish et al, "A programming language model for active documents", ACM UIST, vol. 2,2 pp. 41–50, 2000.*
Dietrich et al. "A reusable graphical user interface for manipulating object oriented database using Java and XML", ACM SIGCSE, pp. 362–366, Feb. 2001.*
Goldberg, "A specification of Java loading and bytecode verification", ACM CCCS, pp. 49–58, Apr. 1998.*

* cited by examiner

Primary Examiner—Anil Khatri
(74) Attorney, Agent, or Firm—Gregory M. Doudnikoff

(57) ABSTRACT

In typical Java and other interpreted programming language environments, the code is stored in ROM in a semi-processed state, .class files containing byte codes. When the device is turned on, a virtual machine resolves references and links the .class file in RAM to permit desired applications to be run. In the invention, the .class files are further pre-processed to select the data which will not change or require updating. This data is packaged into memory image files containing internal data pre-linking this data. The memory image files are stored in ROM and are accessible from ROM by the virtual machine at runtime. Only elements that will be updated, such as the objects themselves, must be instantiated in RAM at runtime. This reduces the amount of RAM needed to run the application. In an environment with memory constraints, the reduction in RAM requirements permits more RAM to be made available for application use.

11 Claims, 8 Drawing Sheets

PACKAGING MEMORY IMAGE FILES

BACKGROUND OF THE INVENTION

1. Field of the Invention

The present invention is directed to the field of managing memory use in run time environments in interpreted programming language environments. In particular, the invention provides a structure for a file of one or more Java™[1] classes that can be stored and accessed at runtime from non-volatile memory such as read only memory (ROM).

[1] Java is a trademark of Sun Microsystems, Inc.

2. Description of the Related Art

Portable devices, including cellular telephones, pagers and personal digital assistants (PDAs), are operated by embedded processing systems. Similar embedded systems are used in other types of devices, including automotive navigational systems found in the new generation of so called "smart" cars and household electrical management systems for remotely controlling home lighting, alarm and other systems.

A feature of embedded systems, particularly in portable devices, is that the memory available is constrained, generally of the order of one to four megabytes. Further, the memory of a system is a subdivided between read only memory (ROM) which can hold permanent data from which the volatile elements are constructed or instantiated in random access memory (RAM) at runtime. The ROM and RAM are fixed during manufacture of the device, although they may be augmented to a limited extent by the addition of PCMCIA cards.

Because of these memory constraints, embedded systems do not contain layers of software between a running application and the hardware components typically found in larger systems. Many embedded applications are designed to run on thin realtime operating systems or with only some interface code (a memory manager and graphics driver) directly on the hardware.

Interpreted language environments, such as Java and Smalltalk, make good runtime operating systems. Typically, the code is stored in ROM in a semi-processed state, class files containing byte codes. When the device is turned on, a virtual machine (VM) resolves references and links the class file to permit desired applications to be run.

One problem with the conventional approach is that the copying of all runtime code to RAM reduces the amount of RAM available for application use. In an environment in which there are limitations on total memory, the assignment of increasingly large portions to RAM reduces the amount of RAM available for application use.

A more general problem is that the time it takes to translate the semi-processed class files to a runtime state delays start up of applications in the device when powering on.

SUMMARY OF THE INVENTION

It is therefore an object of the present invention to provide a means for a directly accessing data stored in ROM in order to be able to maximize the amount of memory available in devices, particularly those with constrained resources.

The invention provides the structure of the portion of data stored in ROM that permits it to be accessed at run time. This is accomplished by prelinking data elements and writing them to files that are stored in ROM. These files are then directly accessible in ROM by the virtual machine at run time.

The invention also provides a process for designing in advance those portions of an application that will change and those that won't, and building the application so that the portions that will not change are accessible directly from ROM at runtime.

One advantage of providing ROM-accessible files is that the RAM requirements for running applications can be reduced. More RAM memory, in a constrained memory environment, is available, thereby permitting more and/or more complex applications to be run on the device at the same time.

In maximizing ROM usage, a further object of the invention is to avoid sacrificing performance due to excessive indirection.

Another advantage realized by prelinking or prereferencing the .class files is that run time files are immediately available from ROM on powering up a device, effectively providing "instant on" capability.

According to these and other objects, the present invention provides a system for use in an interpreted programming environment, in which files are pre-processed to a semi-processed state for linking and execution by a virtual machine at runtime on a target device. The improvement of the invention is a builder which is adapted to analyze the semi-processed files to select data that will not change, and to construct files to be run by the virtual machine from read-only memory on the target device including the selected data and internal pointers from the selected data.

The present invention also provides a data file adapted to be accessed by a virtual machine from read-only memory at runtime. The data file consists of class definitions and byte code data required to run an application, and internal pointers pre-linking the data.

Finally, the invention provides a method for constructing a memory image file for storage in read-only memory of a target device. A maximal set of objects is defined for inclusion in the image file. The maximal set of objects is reduced to remove unused code. Each object of the reduced maximal set is converted to image format, and each image format is written to the memory image file.

BRIEF DESCRIPTION OF THE DRAWINGS

Embodiments of the invention will now be described in detail in association with the accompanying drawings, in which:

FIGS. 3 through 5 are flow diagrams illustrating the process for determining the content of and building a ROM memory image file according to the invention, in which FIG. 3 illustrates a method for determining the maximal set of classes to be included in the build, and FIGS. 4 and 5 (consisting of FIGS. 5A through 5D) illustrate a process for reducing the maximal set of classes to arrive at an optimal content for the ROM memory image file.

DESCRIPTION OF THE PREFERRED EMBODIMENTS

Figure 1:
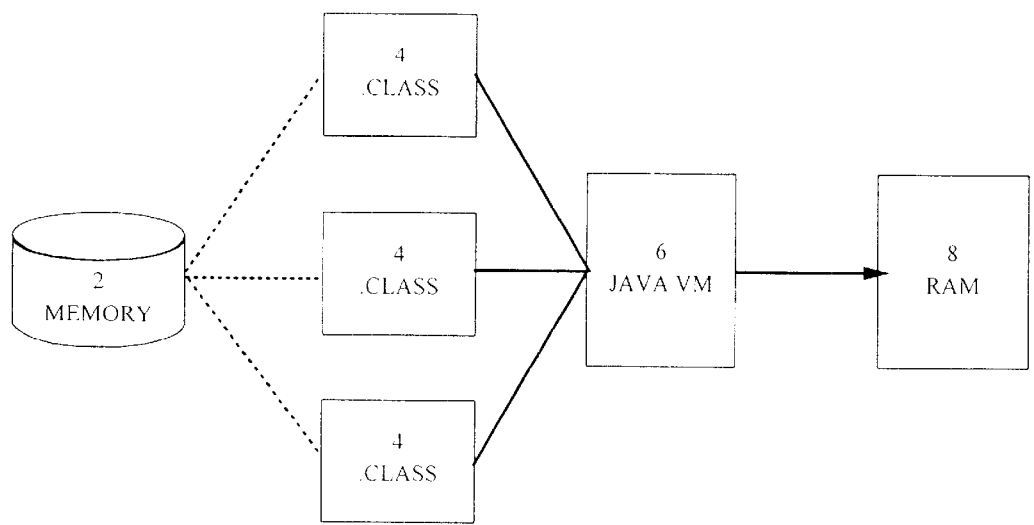
FIG. 1 is a schematic view showing the operation of a convention Java virtual machine processing class files.

As illustrated schematically in FIG. 1 and discussed briefly above, a conventional Java virtual machine ("VM") 6 reads Java .class files 4 containing data in the form of byte codes. The .class files 4 are obtained from memory such as a disk 2. Where the system is embedded, the memory 2 storing the semi-processed class files 4 is the device's ROM.

The class file input to the Java virtual machine 6 may also be in some packaged form such as .jar or .zip files (not shown).

The Java virtual machine 6 processes the .class files 4 with its internal compiler and converts them to a runtime structure in RAM 8 containing all of the data and objects required to execute the application.

Figure 2:
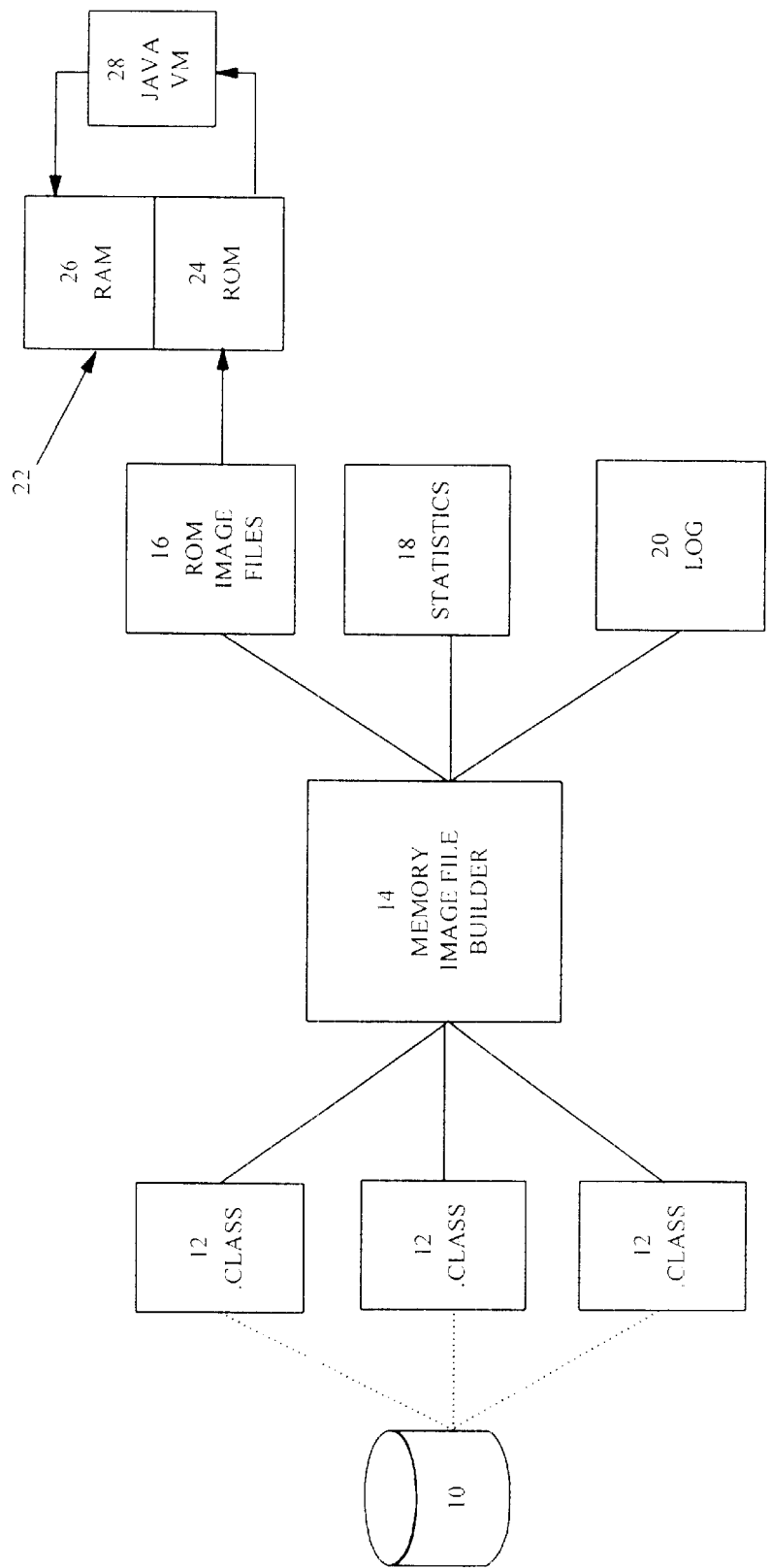
FIG. 2 is a schematic view, similar to FIG. 1, showing the packaging of class files and the use of the packaged files by the virtual machine at run time, according to the invention.

Referring now to FIG. 2, in overview, a pre-processing tool called a memory image file builder ("builder") 14 takes class files 12 from memory 10, determines what data will not change or require updating, such as class definitions and the byte codes themselves, and constructs ROM memory image files 16 (at times abbreviated to "image file") with internal pointers from the selected data. Just as in the conventional Java virtual machine, the builder 14 can take as its .class file input .jar or .zip files (not shown).

According to the preferred embodiment, the ROM memory image files 16 constructed by the builder contain information about the image itself used by a memory manager in the target device for downloading the files to ROM, and by a virtual machine for constructing components in RAM for running applications on the target device. This information includes:
1. A memory segment;
2. A list of virtual machine contexts or processes; and
3. A list of ROM and RAM memory segment descriptors which describe the content of the image file and provide direction for downloading the image file in the described segments to the target device.

A description of the download of memory image files (or application components) to ROM is found in a concurrently filed application titled "Loading and Unloading of Application Components" (IBM docket no. CA9-99-004), which is commonly assigned, and which is incorporated herein by reference.

In addition to ROM image files 16, the memory image build creates, as it runs, statistics 18 of what was packaged and why, and a log 20 which indicates what the builder 14 did, what classes it read, what problems it found, what classes it wrote to the image format, etc.

In the preferred embodiment, all of the builder 14 activity takes place at a server remote from the target device 22.

The ROM memory image files 16 are then loaded into ROM 24 in the device 22. At run time, the Java VM 28 of the invention reads the image files for the running application in ROM 24, and constructs RAM classes pointing to the ROM files. The RAM classes contain material, such as the objects, that will be updated during program execution, for example through garbage collection (implicit memory management). Because it contains only select, changeable material, the portion of memory required for RAM will be much smaller than the portion used for ROM.

A memory image file contains definitions for one or more Java classes which are laid out contiguously in memory. The classes included in the memory image file are those required to construct an image or provided to find grouping of functionality in the target device, such as the basic system operations.

Figure 3:
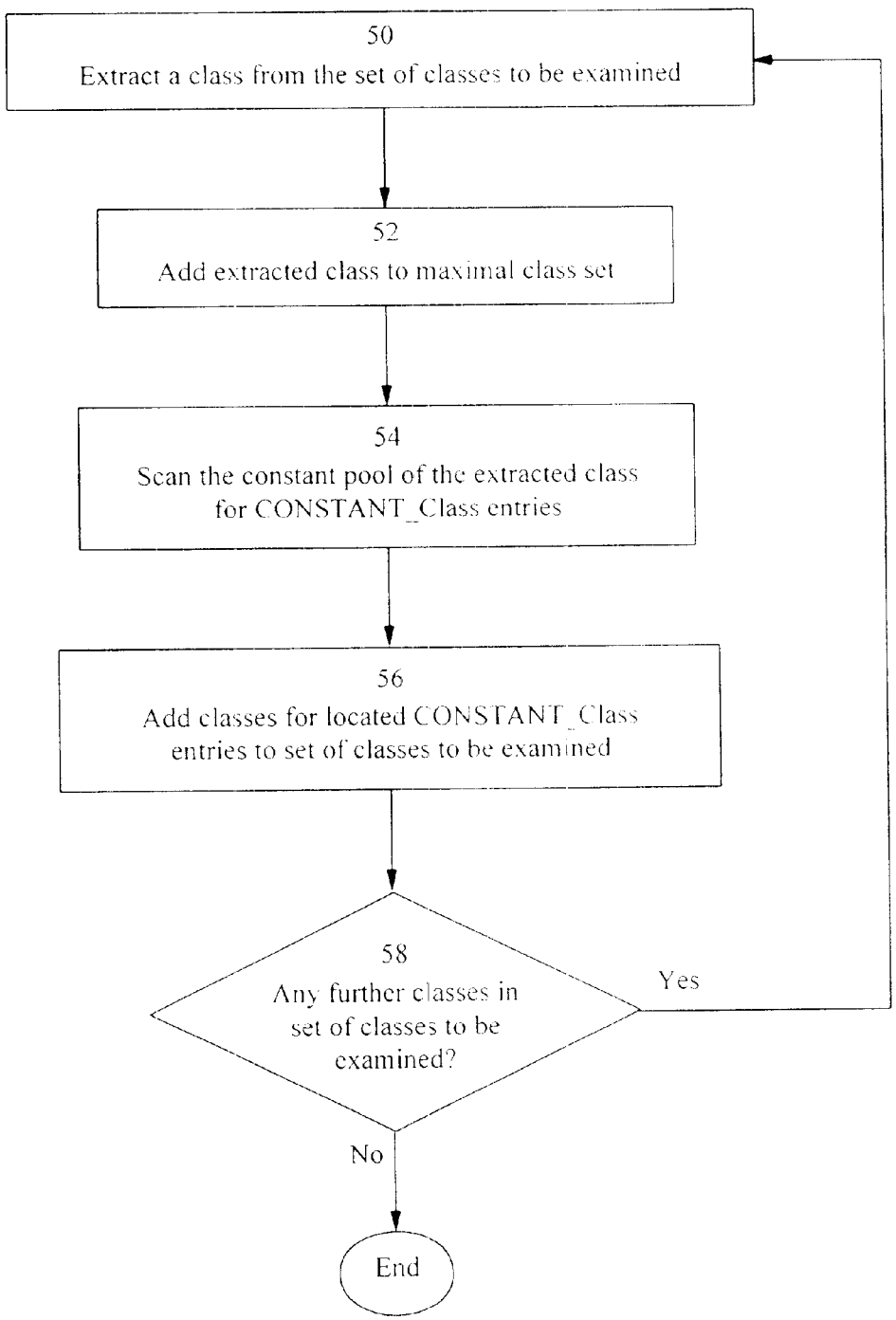
Figure 4:
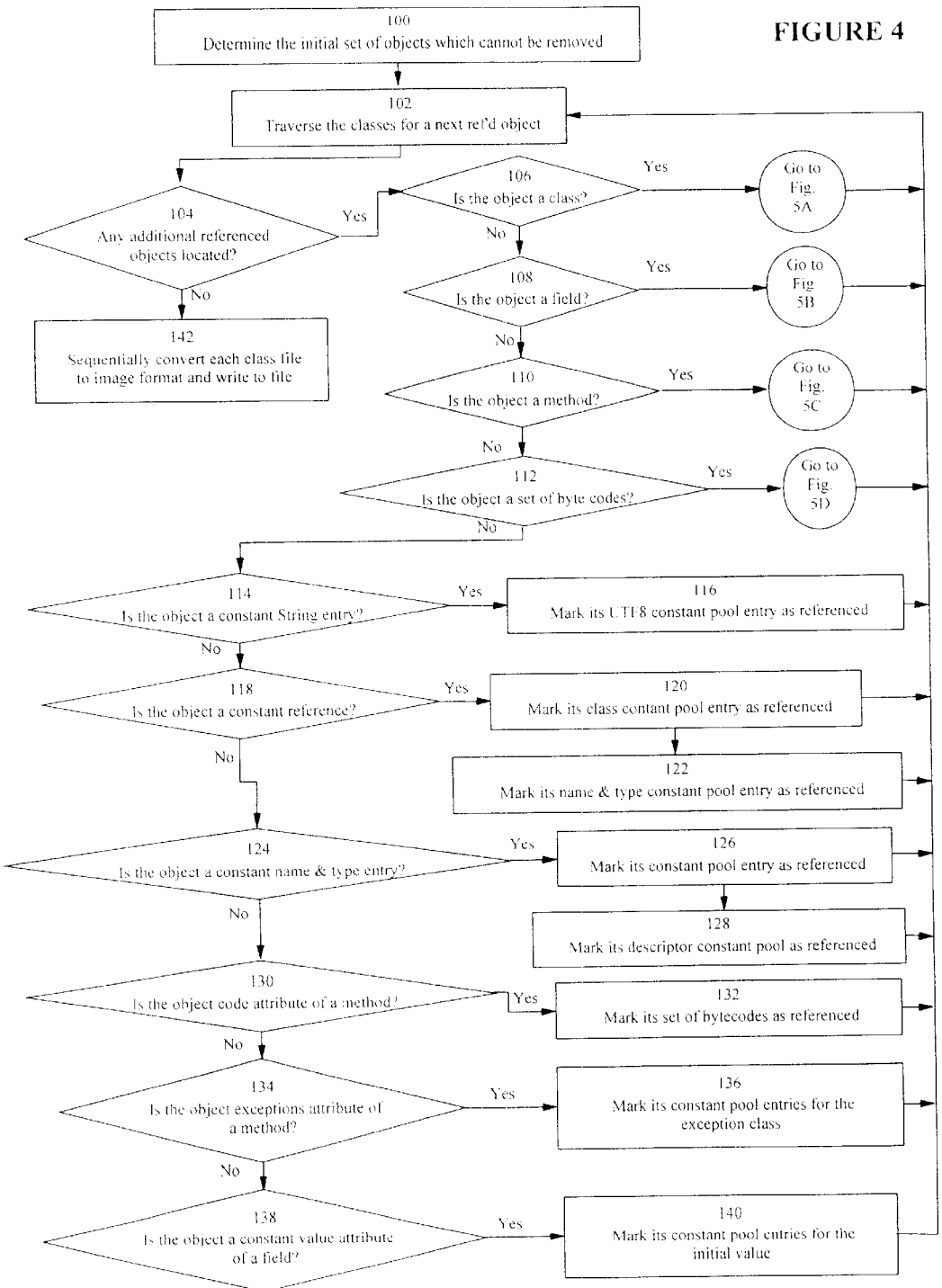
Figure 5A:
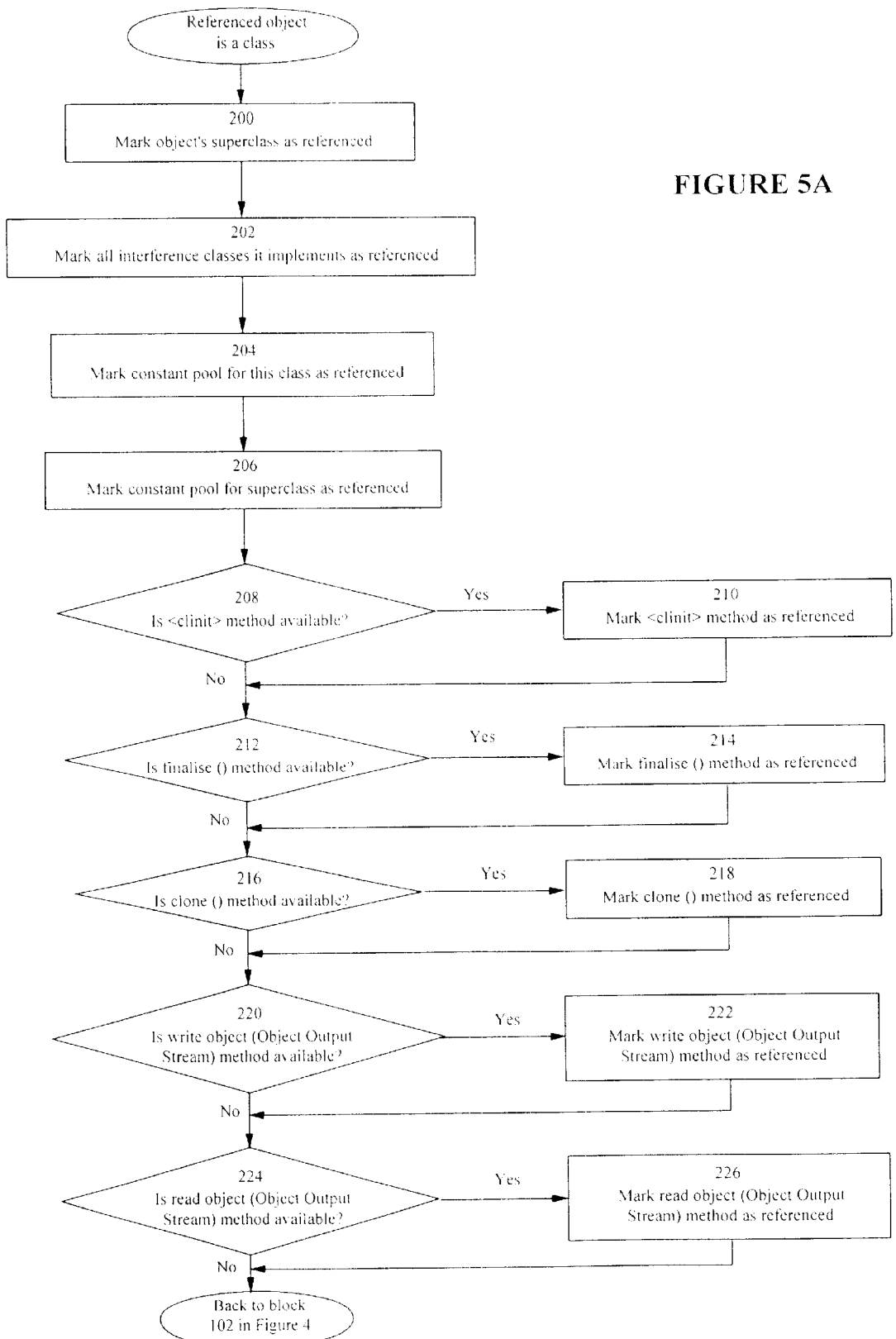
Figure 5B:
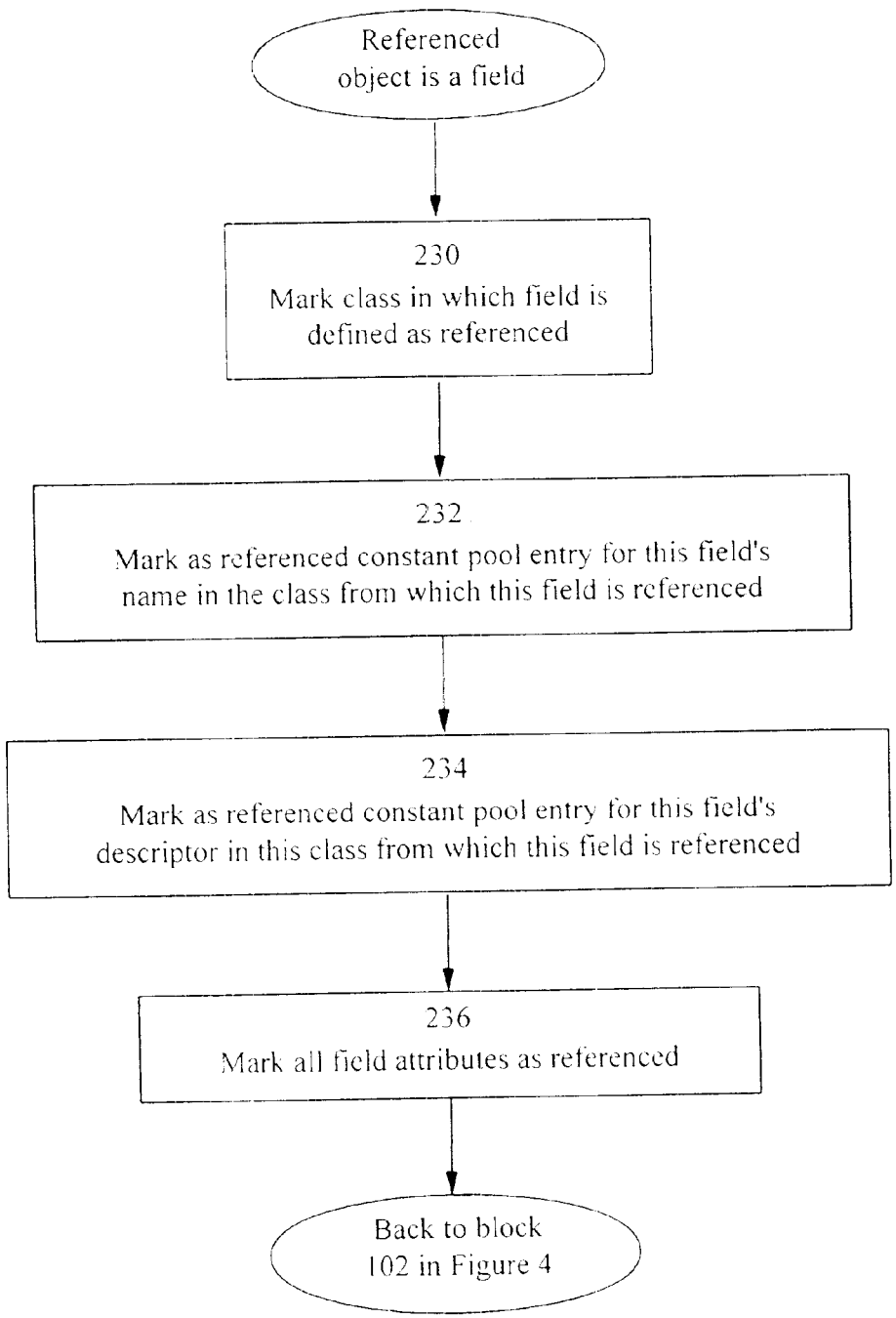
Figure 5C:
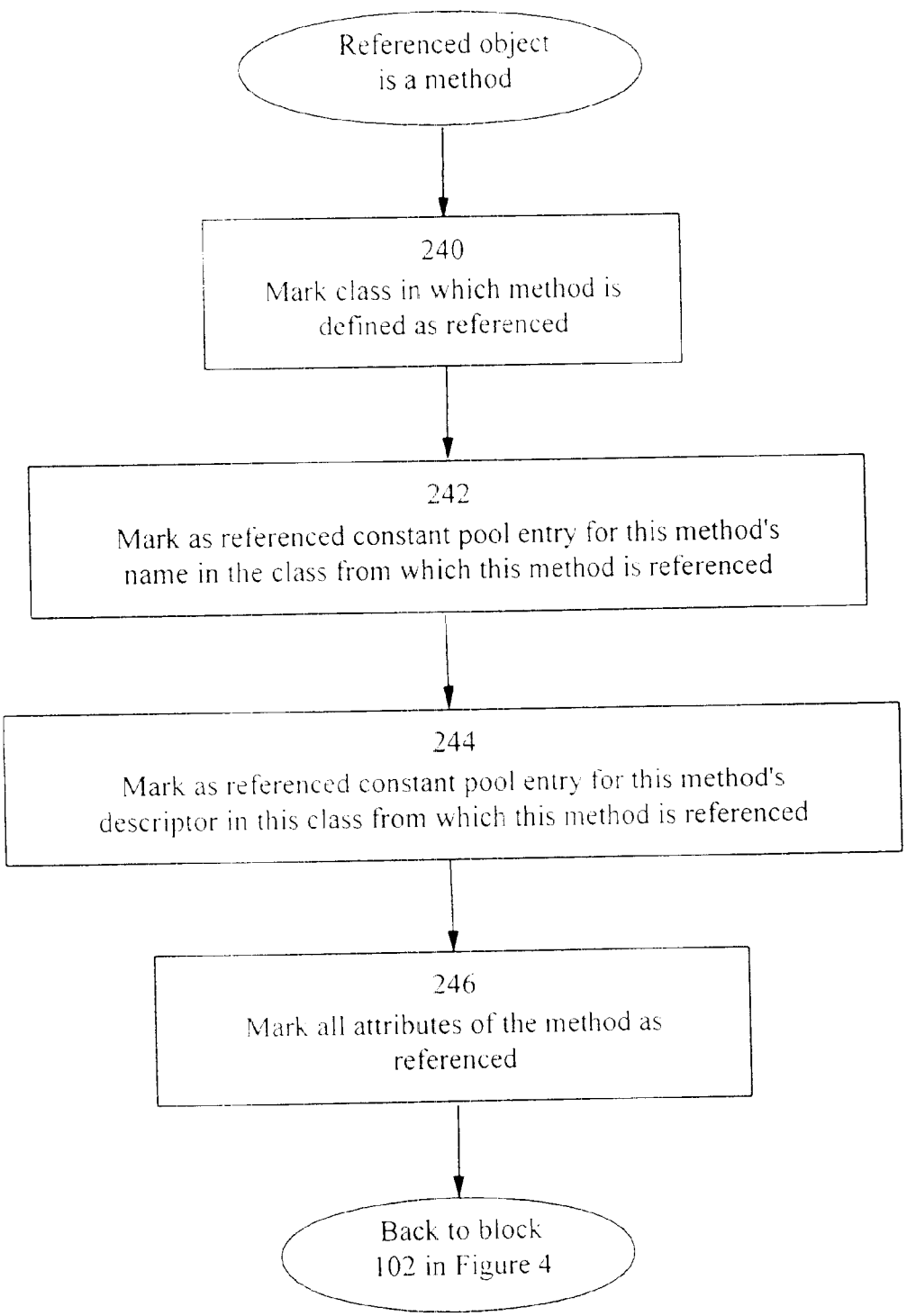
Figure 5D:
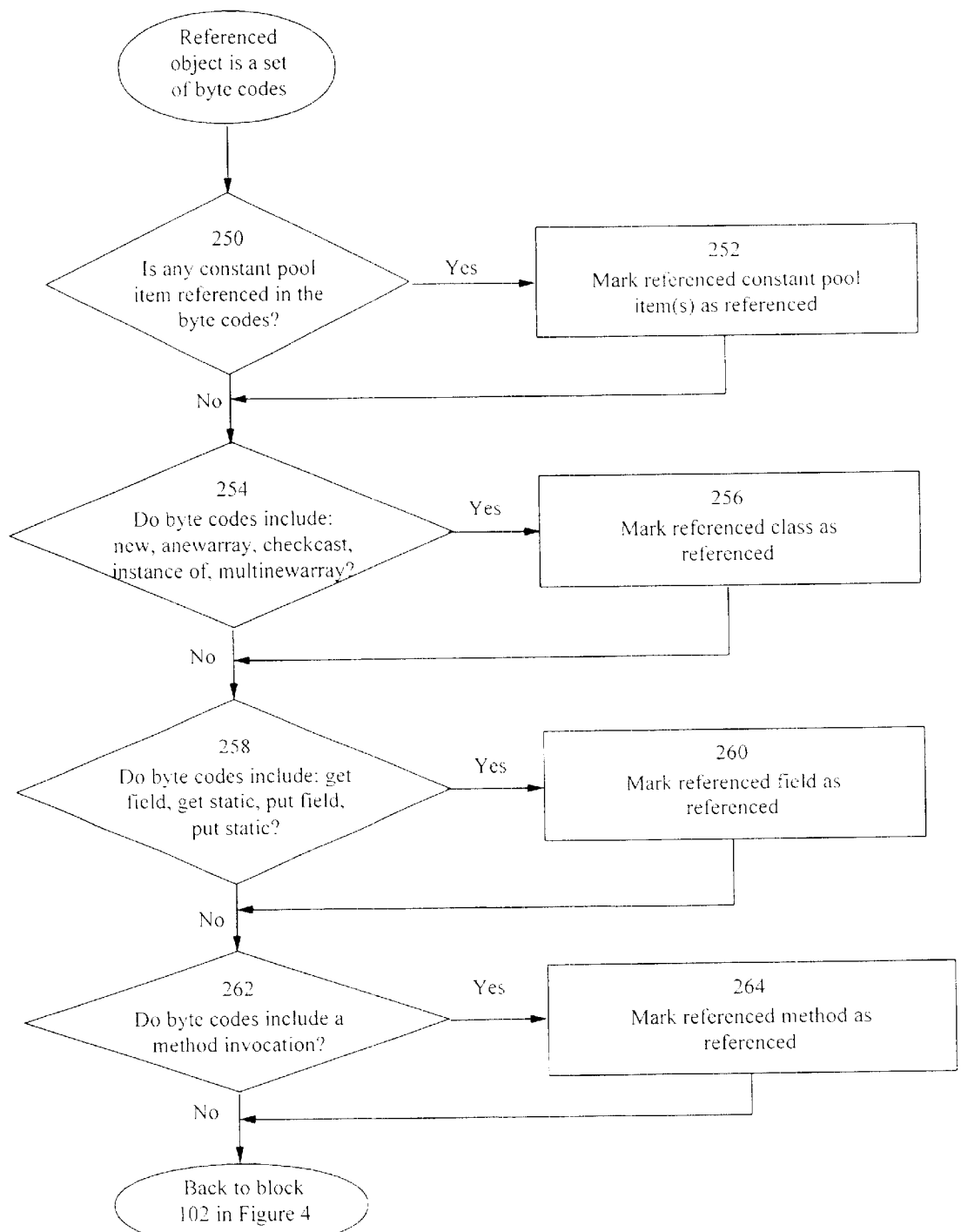

FIGS. 3, 4 and 5 are flow diagrams illustrating the steps for building an image file, according to the invention. The tool used to package the memory image file is the memory image file builder discussed above.

The first object of the builder is to determine the maximal set of classes, that is, the set of all objects which cannot be excluded from being built to the image format because they are referenced in some way. A preferred method is illustrated in FIG. 3.

An initial set of objects which cannot be removed is determined. This initial set can be some initial set of Java .class files to be converted to image format specified by the user. In most cases, the initial maximal set can be determined by including the class containing the main( ) method of an application, since this will result in all needed classes being pulled in by the builder. However, Java native interface (JNI) code may reference other classes, and Java code may use reflection or Class.forName( ) to dynamically reference other classes. In these cases, the user will have to explicitly include these classes in the initial set of classes for the builder to process.

Beginning with the initial set of classes, including the class which contains the main( ) method for an application, the true maximal class set must be determined. This set is determined by examining the constant pool for each class. The constant pool is a table of structures accessed by the bytecodes by index. The constant pool is examined to find other CONSTANT_Class references. These references point to other classes which must be added to the maximal set. This processing is recursive; that is, each class found via a reference to a CONSTANT_Class entry in the constant pool will also be examined to find further class references.

Referring to FIG. 3, a class is extracted from the set of classes to be examined (block 50). The extracted class is added to the maximal class set (block 52). This class is analyzed by scanning its constant pool looking for CONSTANT_Class entries. The classes located by this analysis are added to the set of classes to be examined (block 56). This process is repeated until the set of classes to be examined is empty. (block 58) and the true maximal class set has been captured.

Once the maximal set of classes has been determined, an optional reduction step can be run.

This step will remove unused classes, methods and fields from the resulting image format.

The set of objects which can be removed is obtained by first determining what objects cannot be removed. Then the set of objects which can be removed is everything outside of the set of objects that cannot be removed.

Referring to FIG. 3, a class is extracted from the set of classes to be examined (block 50). The extracted class is added to the maximal class set (block 52). This class is analyzed by scanning its constant pool looking for CONSTANT_Class entries. The classes located by this analysis are added to the set of classes to be examined (block 56). This process is repeated until the set of classes to be examined is empty (block 58) and the true maximal class set has been captured.

Once the maximal set of classes has been determined, an optional reduction step can be run.

This step will remove unused classes, methods and fields from the resulting image format.

The set of objects which can be removed is obtained by first determining what objects cannot be removed. Then the set of objects which can be removed is everything outside of the set of objects that cannot be removed.

The act of determining that an object cannot be removed is referred to as 'marking it as referenced'. In the preferred embodiment of the method, the process of marking objects as referenced begins with the application's main( ) method. The virtual machine may require certain classes, methods, or fields be present when it starts, and these must also be marked as referenced. Lastly, there may be objects which are used dynamically such as classes loaded via reflection or the Class.forName( ) method which also must be added to the initial list of objects to be marked as referenced.

Referring to FIG. 4, once the initial list of objects to mark as referenced is determined (block 100), marking further objects as referenced is determined by examining each referenced object (blocks 102, 104) to determine whether it falls into one of the following categories: a class (block 106), a field (block 108), a method (block 110), a set of byte codes (block 112), a constant string entry (block 114), a constant reference (block 118), a constant name_and_type entry (block 124), an attribute of a method (block 130), an exceptions attribute of a method (block 134) or a constant value attribute of a field (block 138). All other attributes of classes, methods and fields are ignored.

There are two optimizations that the builder makes across all the classes being converted. The builder will only write one copy of unique strings to the image file. If this was not done, the string "java/lang/Object", for instance, would be written to the image multiple times. As a second optimization. the builder only writes one copy of unique CONSTANT_NameAndType entries.

Although the preferred embodiment has been described in association with a specific platform and programming environment, it will be understood by those skilled in the art that modifications to this invention obvious to the person skilled in the art are intended to be covered by the appended claims.

The embodiments of the invention in which an exclusive property or privilege is claimed are defined as follows:

1. In an interpreted programming environment, a system in which files are pre-processed to a semi-processed state for linking and execution by a virtual machine at runtime on a target device, wherein the improvement comprises:

a pre-processing tool adapted to analyze the semi-processed files to select data that will not change, and to construct files to be run by the virtual machine from read-only memory on the target device including the selected data and internal pointers from the selected data.

2. A computer-readable program stored on computer readable medium comprising a data file adapted to be accessed by a virtual machine from read-only memory (ROM) at runtime, the data file comprising:

class definitions and byte code data required to run an application; and internal pointers pre-lining the data.

3. A computer-readable program according to claim 2, wherein the data file further comprises ROM and random access memory (RAM) segment descriptors providing direction for downloading the data file in segments to a target device.

4. A computer-readable program according to claim 2, wherein the data file further comprises:

a list of virtual machine contexts; and a list of ROM and random access memory (RAM) segment descriptors describing the data file content, said list being accessible by the virtual machine at runtime.

5. A method for constructing a memory image file for storage in read-only memory (ROM) of a target device, comprising:

defining a maximal set of objects for inclusion in the image file;

reducing the maximal set of objects to remove unused code;

converting each object of the reduced maximal set to image format; and writing each image format to the memory image file.

6. The method, according to claim 5, wherein the step of defining the maximal set of objects comprises:

i) adding a class containing a main( ) method to the maximal set;

ii) examining references in classes in the maximal set to locate new classes;

iii) adding the located classes to the maximal set; and iv) repeating steps ii) and iii) until no new classes are located.

7. The method, according to claim 5, wherein the step of defining the maximal set of objects comprises:

i) determining a set of classes to be examined;

ii) extracting a class from the set of classes to be examined;

iii) adding the extracted class to the maximal set of classes;

iv) analyzing the extracted class to locate references to other classes;

v) adding the located classes to the set of classes to be examined; and vi) repeating steps ii) through v) until the set of classes to be examined is empty.

8. The method according to claim 5, wherein the step of reducing the maximal set of objects to remove unused code comprises:

examining each object in the maximal set to identify each referenced attribute;

determining whether the object depends on each referenced attribute for an application to run; and if a dependency is found, adding the referenced attribute to the maximal set of objects, else, removing the referenced attribute from the maximal set of objects.

9. The method, according to claim 5 wherein the step of writing each image format to the memory file comprises:

writing a single copy of unique strings to the image file.

10. The method, according to claim 5, wherein the step of writing each image format to the memory file comprises:

writing a single copy of unique constant name and type entries to the image file.

11. A computer program product comprising a computer usable medium having computer readable program code means embodied therein for causing a computer to construct a memory image file for storage in read-only memory (ROM) of a target device, the computer readable program code means in said computer program product comprising:

computer readable program code means for causing the computer, to define a maximal set of objects for inclusion in the image file;

computer readable program code means for causing the computer, to reduce the maximal set of objects to remove unused code;

computer readable program code means for causing the computer, to convert each object of the reduced maximal set to image format; and computer readable program code means for causing the computer, to write each image format to the memory image file.

* * * * *